United States Patent [19]

Sturges

[11] 4,098,543
[45] Jul. 4, 1978

[54] ADAPTER PAD FOR TRACK LINK AND TRACK SHOE

[75] Inventor: James R. Sturges, Washington, Ill.

[73] Assignee: Caterpillar Tractor Co., Peoria, Ill.

[21] Appl. No.: 787,815

[22] Filed: Apr. 15, 1977

[51] Int. Cl.² .............................................. B62D 55/28
[52] U.S. Cl. ...................................................... 305/54
[58] Field of Search ............................. 305/54, 46, 60; 428/306; 29/401 A, 401 C, 401 R; 264/36

[56] References Cited

U.S. PATENT DOCUMENTS

| 1,257,579 | 2/1918 | Champlin | 305/46 |
| 3,395,105 | 7/1968 | Washburn et al. | 428/306 X |
| 3,762,780 | 10/1973 | Tomizawa | 305/54 X |
| 3,937,530 | 2/1976 | Sturges | 305/54 |

Primary Examiner—Robert B. Reeves
Assistant Examiner—John P. Shannon
Attorney, Agent, or Firm—Wegner, Stellman, McCord, Wiles & Wood

[57] ABSTRACT

A hardenable insert for use with a reversible track link in an endless track assembly to be interposed between the worn side of a used track link and a track shoe applied thereto. The pad includes a matrix which is formed of a deformable binder or filler material, an uncured resin flowable in its uncured state and rigid when cured. The resin impregnates the pad. The pad also includes a plurality of rupturable capsules dispersed throughout the pad, the capsules containing a curing agent for the resin so that when the pad is interposed between the worn side of a reversible track link and a track shoe, and the track shoe is clamped to the track link, the pad will deform to conform to irregularities at its interface with the track link and the capsules will rupture to cause the curing agent to cure the resin to rigidify the pad and thereby provide a smooth interface to prevent loosening of the track link and the track shoe during subsequent use.

6 Claims, 4 Drawing Figures

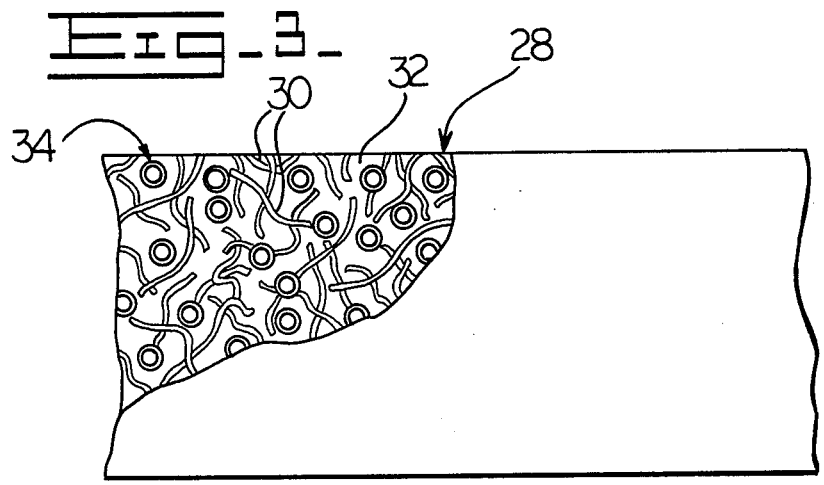
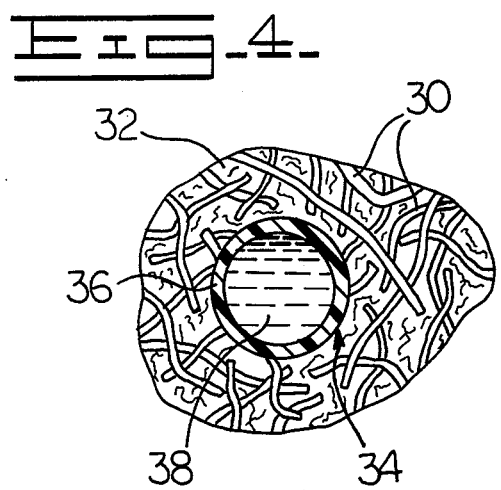

ADAPTER PAD FOR TRACK LINK AND TRACK SHOE

BACKGROUND OF THE INVENTION

This invention relates to endless track assemblies for use with crawler-type vehicles and, more specifically, to an adapter strip for use in such assemblies when the same are of the type including reversible track links.

Prior art of possible relevance includes U.S. Pat. No. 3,937,530, issued Feb. 10, 1976 to Sturges and assigned to the assignee of the present application.

Due to the extreme environmental conditions in which crawler-type vehicles are typically employed, considerable wear occurs to the endless track assemblies employed with such vehicles. Replacement of worn parts in the track assembly has long been a vexing problem because of the relatively rapid wear rate and expense of the replacement parts.

Sturges, in the above identified patent, discloses a unique endless track assembly for crawler-type vehicles wherein the cost of replacing certain assembly components due to wear is cut about in half. In particular, Sturges discloses a unique form of track link which is reversible. Track links typically have track shoes bolted to one side thereof while the opposite side rubs against the track roller on the vehicle. Sturges proposes to make the track links generally symmetrical about their longitudinal axis so that when replacement is required, rather than substituting new track links, the links are merely reversed and the track shoes applied to the sides of the track link originally in abutment with the track rollers of the vehicle and whereby the side of the track link to which the track shoe was originally secured is then placed in contact with the track rollers.

Such reversible track links have been generally satisfactory for their intended purpose. However, due to the extreme environment in which such vehicles are operated, foreign matter frequently enters the interface of the track roller and the track link forming significant irregularities in the side of the link originally installed in abutment with the track rollers. Consequently, when the link is reversed, an uneven surface is exposed to the track shoe and when the track shoe is applied thereagainst, it may tend to rock on the surface causing progressive loosening of the fastening bolts by which the shoe is secured to the link.

SUMMARY OF THE INVENTION

It is a principal object of the invention to provide a new and improved means whereby a track shoe may be secured to the worn side of a reversible track link while eliminating the possibility of premature loosening of fastening bolts or the like. More specifically, it is an object of the invention to provide a means whereby the worn interface between the track shoe and the track link is smoothed to prevent any tendency of the track shoe to rock on the track link and thereby eliminate premature loosening of securing means.

An exemplary embodiment of the invention achieves the foregoing objects in an adapter including a pad having a matrix of deformable binder or filler material. An uncured resin which is flowable in its uncured state and rigid when cured impregnates the pad. A plurality of rupturable capsules are dispersed throughout the pad and the capsules contain a curing agent for the resin. When the pad is interposed between the worn side of a reversible track link and a track shoe, and the track shoe is clamped to the track link, the pad will deform to conform to irregularities at its interface with the components and the capsules will rupture to cause the curing agent to cure the resin, thereby rigidifying the pad and providing a smooth interface to prevent loosening of the track link and the track shoe.

In a preferred embodiment, the binder or filler material comprises a fibrous material.

In a highly preferred embodiment, the pad will normally have a thickness of at least about one-eighth inch. When the pad is applied to the interface of a reversible link and a track shoe, it is preferred that the securing means by which the track shoe is secured to the link include clamping means which are capable of deforming the pad to rupture the capsules.

Other objects and advantages will become apparent from the following specification taken in connection with the accompanying drawings.

DESCRIPTION OF THE DRAWINGS

FIG. 3 is a sectional view of a pad made according to the invention; and

FIG. 4 is an enlarged, fragmentary, sectional view of the pad.

DESCRIPTION OF THE PREFERRED EMBODIMENT

Figure 1:
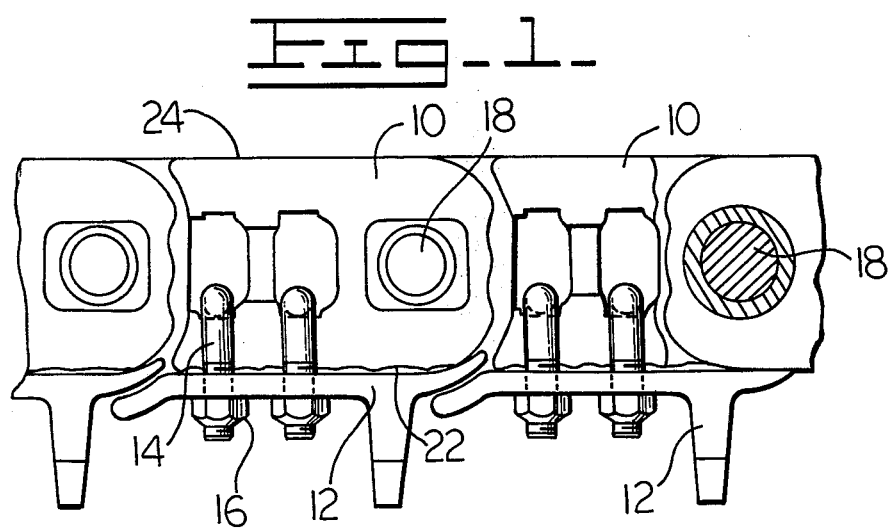
FIG. 1 is a fragmentary view of an endless track assembly embodying the invention with parts broken away for clarity.
Figure 2:
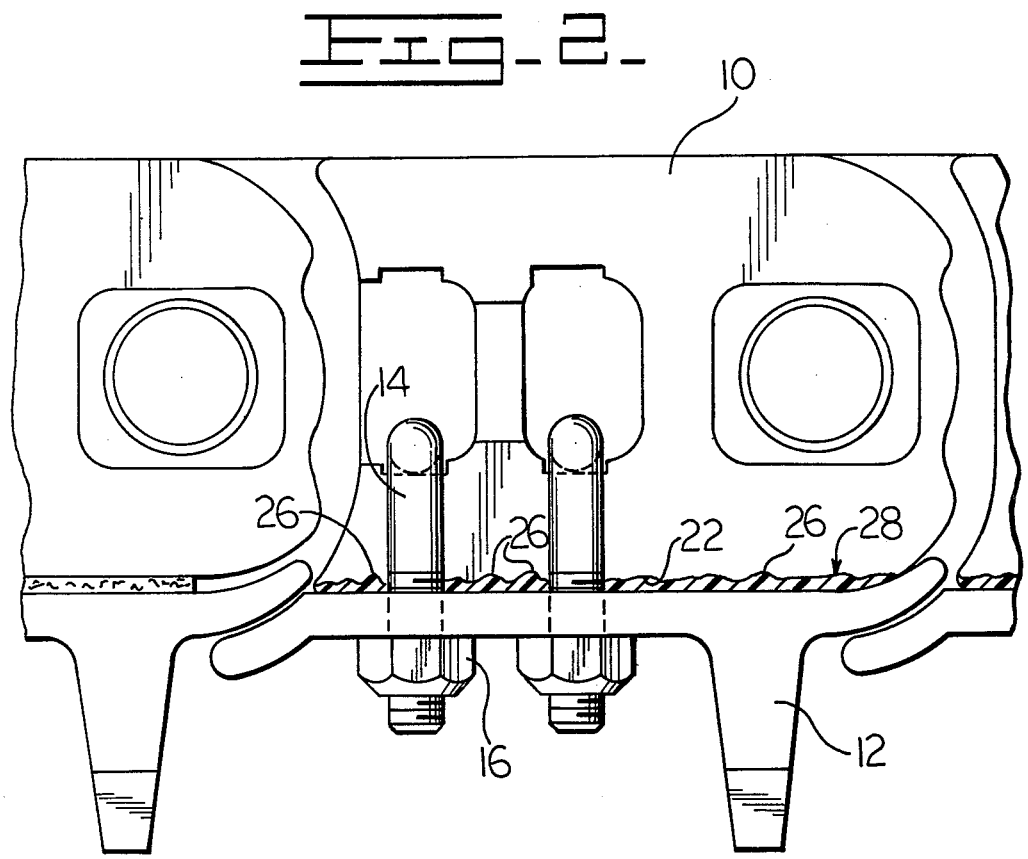
FIG. 2 is an enlarged, fragmentary view of the assembly.

As seen in FIGS. 1 and 2, an adapter according to the invention is embodied in an endless track assembly including reversible track links made according to the teachings of the Sturges patent identified previously, the details of which are incorporated by reference. The endless track assembly includes a plurality of track links 10 to which are secured a corresponding number of track shoes 12. The track shoes 12 are secured in place by U-bolts 14 and nuts 16 in the manner disclosed by Sturges.

Adjacent links 10 are pivoted together by pins 18, also in the manner disclosed by Sturges. As seen in FIG. 1, the links 10 are symmetrical about the longitudinal axis, that is, the axis extending along the length of the assembly, and include a side 22 to which the track shoes 12 are secured and an opposing side 24. As seen in FIG. 1, the assembly has already been reversed with the side 22 being worn by virtue of its contact with the track rollers (not shown) of the crawler-type vehicle with which the assembly is utilized.

As best seen in FIG. 2, the wear between the side 22 and the track roller has caused a plurality of irregularities 26 to be formed in the surface 22, which irregularities 26 are not conducive to good contact and support of the track shoes 12 by the links 10. Accordingly, an adapter strip or pad 28 made according to the invention is interposed between the surface 22 and the track shoe 12. As seen in FIG. 2, the pad 28 has deformed to fill the irregularities 26 and thereby present a flat, flush surface to the track shoe 12 which will support the same during use to prevent any tendency of minute movements between the track shoe 12 and the link 10 from loosening the securing bolts 14.

Referring now to FIGS. 3 and 4, the details of the pad 28 will be explained. The pad 28 includes a matrix of filler or binder material such as fibers 30. The matrix is then saturated or impregnated with an uncured resin 32 of the type which is at least somewhat flowable under pressure when in an uncured state and rigid when cured. For example, an epoxy resin could be utilized as the resin 32.

As best seen in FIG. 3, the matrix 28 has dispersed therein, a plurality of rupturable capsules 34. As seen in FIG. 4, the capsules 34 include an outer shell 36 which is inert to the resin 32 and the filler material 30 and contain therein, a body of liquid 38 which is a curing agent for the resin 32.

As a consequence, when the pad 28 is interposed between the worn side 22 of a reversible track link 10 and a track shoe 12 to be applied thereagainst, when the bolts 14 are tightened, the fibers 30 will deform and the resin 32 will flow into the irregularities 26 in the surface 22. At the same time, the pressure of the clamping force will cause the capsule walls 36 to rupture thereby releasing the curing agent into the matrix and the resin 32 contained therein. The resin 32 will then cure and become rigid to rigidify the pad 28 in its deformed state. The resin 32 will also bond to the track link 10 and provide a smooth surface to the track shoe 12, which surface will support the same along its entire length to prevent any minute rocking motion that would tend to loosen the bolts 14.

Epoxy resins may be employed as desired. However, no limitation is intended as to the specific form of resin, it only being necessary that the same have the characteristic mentioned above. A filler or binding material need not be in the form of fibers 30, but preferably will be. The main purpose of the same is to enable the formation of a pad that will contain the uncured resin for ease of installation at the interface between the track link 10 and the track shoe 12.

Where not only filler and/or binding characteristics are required of the resin, strengthening material in the form of strengthening fibers 30 or in the form of metal particles can be incorporated in the matrix.

Any desired form of capsule may be used, including mechanically molded capsules. However, since it is intended that they be thoroughly dispersed throughout the matrix to ensure relatively complete curing of the resin, they will generally be in the form of so-called "microcapsules" of the type used in so-called "carbonless" paper or the like.

In general, the pad 28 will have a thickness of at least about one-eighth inch to ensure that even the deepest irregularities 26 will be filled when the track shoe 12 is clamped onto the track link 10.

While not shown herein, it is contemplated that the pad 28 may be in continuous form and be cut to size dependent upon the endless track assembly with which it is to be used. Alternately, it may be cut into individual pieces appropriately sized for given assemblies. It is also contemplated that removable masks as, for example, a paper mask be employed on both sides of the pad 28 to enhance its shelf life and/or enhance its handling qualities.

From the foregoing, it will be appreciated that a pad made according to the invention is ideally suited for use with reversible track links in endless track assemblies and provides a positive means for preventing premature loosening of the bolts typically used to secure track shoes to such links when the shoes are secured to one side of a link.

I claim:

1. For use with an endless track assembly, the combination of:
    a track component; and
    a hardenable insert abutted against one side of said track component and including
    a pad including a matrix of deformable binder or filler material;
    an uncured resin flowable in its uncured state and rigid when cured, said resin impregnating said pad; and
    a plurality of rupturable capsules dispersed throughout said pad, said capsules containing a curing agent for said resin,
    whereby when said track component is abutted against another, differing track component such that said pad is interposed between the two components, and the track components are clamped together, said pad will deform to conform to irregularities at its interface with the track components and said capsules will rupture to cause said curing agent to cure said resin to rigidify said pad and thereby provide a smooth interface to prevent loosening of said track components.

2. The combination of claim 1 wherein said binder or filler material comprises fibrous material.

3. The pad of claim 1 wherein said combination has a thickness of at least about one-eighth inch.

4. An endless track assembly for crawler-type vehicles comprising:
    a plurality of pivotally interconnected track links, said track links being symmetrical about their longitudinal axis so as to be reversible when one side becomes worn;
    a plurality of track shoes, one for each track link;
    means for selectively securing said track shoes to either side of a corresponding one of said track links;
    a pad including a matrix of deformable binder or filler material;
    an uncured, resin flowable in its uncured state and rigid when cured, said resin impregnating said pad; and
    a plurality of rupturable capsules dispersed throughout said pad, said capsules containing a curing agent for said resin, said pad being interposable between one of said track links and the corresponding track shoe.

5. The endless track assembly of claim 4 wherein said securing means comprise clamping means for deforming said pad and rupturing said capsules.

6. The endless track assembly of claim 4 wherein said binder or filler material is fibrous material.

* * * * *